US010376809B2

(12) United States Patent
Nielsen

(10) Patent No.: US 10,376,809 B2
(45) Date of Patent: Aug. 13, 2019

(54) INSERT FOR AN ATOMIZER WHEEL AND ATOMIZER WHEEL COMPRISING A NUMBER OF SUCH INSERTS

(71) Applicant: GEA Process Engineering A/S, Soborg (DK)

(72) Inventor: Erling Skov Nielsen, Hillerod (DK)

(73) Assignee: GEA Process Engineering A/S, Soborg (DK)

( * ) Notice: Subject to any disclaimer, the term of this patent is extended or adjusted under 35 U.S.C. 154(b) by 235 days.

(21) Appl. No.: 14/134,864

(22) Filed: Dec. 19, 2013

(65) Prior Publication Data

US 2014/0175188 A1 Jun. 26, 2014

(30) Foreign Application Priority Data

Dec. 20, 2012 (DK) .................................. 201270806
Dec. 20, 2012 (WO) ................ PCT/DK2012/050490

(51) Int. Cl.
*B05B 1/06* (2006.01)
*B01D 1/18* (2006.01)
(Continued)

(52) U.S. Cl.
CPC .................. *B01D 1/18* (2013.01); *B05B 1/06* (2013.01); *B05B 3/1028* (2013.01); *F26B 3/12* (2013.01)

(58) Field of Classification Search
CPC ........... B01D 1/18; B05B 3/1007; B05B 1/02; B05B 1/06; F26B 3/12
(Continued)

(56) References Cited

U.S. PATENT DOCUMENTS 2,060,239 A * 11/1936 Peltzer ...................... B04B 1/12 494/43
2,925,224 A * 2/1960 Cunningham ............ B05B 1/02 239/548
(Continued)

FOREIGN PATENT DOCUMENTS

CN 102553741 A 7/2012
EP 0014056 A1 8/1980
(Continued)

OTHER PUBLICATIONS

Communication dated Feb. 1, 2016 issued by the State Intellectual Property Office of the People's Republic of China in counterpart application No. 201280077942.9.
(Continued)

*Primary Examiner* — Jason J Boeckmann
(74) *Attorney, Agent, or Firm* — Sughrue Mion, PLLC

(57) ABSTRACT

The insert (20) is adapted to be fitted into an atomizer wheel. Each insert (20) has a longitudinal axis and comprises an inner end face (21), an outer end face (22), an external surface (23) and an internal surface (24) defining a channel (35) having a center axis (c) and extending between an inlet (25) at the inner end face (21) and an outlet (26) at the outer end face (22). At least the inlet (25) is offset from the longitudinal axis such that the center axis of the channel (35) is offset from the longitudinal axis of the insert (20). The insert (20) is adapted to be utilized in an atomizer wheel for a spray dryer for atomizing slurries of abrasive material, for instance for spray drying absorption for flue gas cleaning.

24 Claims, 6 Drawing Sheets

(51) Int. Cl.
*B05B 3/10* (2006.01)
*F26B 3/12* (2006.01)

(58) Field of Classification Search
USPC ..................... 239/223, 224, 7, 597–599, 601
See application file for complete search history.

(56) References Cited

U.S. PATENT DOCUMENTS

| | | | | | |
|---|---|---|---|---|---|
| 3,137,354 | A | | 6/1964 | Crawford et al. | |
| 3,228,598 | A | * | 1/1966 | Kieth | B04B 1/08 494/27 |
| 3,640,467 | A | | 2/1972 | Moller et al. | |
| 4,121,770 | A | * | 10/1978 | Straarup | B01D 1/20 239/224 |
| 4,311,270 | A | | 1/1982 | Hovstadius | |
| 4,684,065 | A | | 8/1987 | Svarrer | |
| 4,898,331 | A | * | 2/1990 | Hansen | B05B 3/1028 239/223 |
| 6,216,959 | B1 | * | 4/2001 | Garrison | B04B 1/10 239/1 |
| 6,390,211 | B1 | | 5/2002 | Tibbitts | |
| 6,457,657 | B1 | * | 10/2002 | Nielsen | B01D 1/20 239/224 |
| 6,581,431 | B2 | * | 6/2003 | Vrubl | B21C 23/085 72/260 |

FOREIGN PATENT DOCUMENTS

| | | | |
|---|---|---|---|
| EP | 0375236 | A2 | 12/1989 |
| EP | 1 184 081 | A | 7/2004 |
| WO | 02078859 | A1 | 10/2002 |
| WO | 2008/011228 | A1 | 1/2008 |

OTHER PUBLICATIONS

International Search Report of PCT/DK2012/050490.

* cited by examiner

INSERT FOR AN ATOMIZER WHEEL AND ATOMIZER WHEEL COMPRISING A NUMBER OF SUCH INSERTS

CROSS-REFERENCE TO RELATED APPLICATIONS

The present application claims the benefit of priority from Danish Patent Application No. PA 2012 70806 filed on Dec. 20, 2012, and PCT application No. PCT/DK2012/050490 filed on Dec. 20, 2012.

FIELD OF THE INVENTION

The present invention relates to an insert for an atomizer wheel for a spray dryer, said insert having a longitudinal axis and comprising an inner end face, an outer end face, an external surface and an internal surface defining a channel having a centre axis and extending between an inlet at the inner end face and an outlet at the outer end face. The invention furthermore relates to an atomizer for a spray dryer comprising a number of such inserts.

BACKGROUND OF THE INVENTION

In the atomization of slurries such inserts are inserted into the atomizer wheel in order to guide the slurry feed out of the atomizer for forming droplets for the further drying and/or absorption process. During atomization, the internal structures of the atomizer wheel, including the inserts, are exposed to wear which, depending on the slurry to be atomized, may even be very heavy. However, this wear is normally restricted to certain well-defined areas of the atomizer wheel or inserts.

In general, the wear on different parts of the atomizer wheel arises during rotation of the wheel, where owing to the centrifugal forces and the nature of the feed, the feed affects the internal parts with a force that causes heavy abrasion. Parts exposed to abrasion from feed are therefore made abrasion-resistant and replaceable.

A series of improvements have been suggested in order to enhance the abrasion-resisting properties of the internal structures of the atomizer wheel, in order to prevent the ongoing deformation and possibly fracture, e.g. as disclosed in U.S. Pat. Nos. 3,640,467 and 4,684,065 (Niro).

Disclosed in both documents are inwards-protruding inserts which ensure that a layer of liquid will deposit on the internal wall of the wheel during the rotation and hereby prevent wear. Owing to the centrifugal forces the heavier parts of the layer, i.e. the suspended solid material, is separated from the liquid in the layer and deposited directly on the wall so as to fill the area surrounding the inwardly extending portions of the inserts. In this way the inner surface of the wheel rim is protected against abrasion from the feed, since during operation a layer of feed solids will settle on the inside wall to a thickness determined by the length of the protrusion, consequently the abrasion will take place on the sedimented layer itself and not on the inside wall of the wheel.

However, it has turned out that these inserts during atomization of some abrasive slurries experience extremely high wear on the foremost parts, seen in the tangential or rotational direction, which has entailed that not only the wear-resistant lining but also the steel bushing show sign of wear. It is believed that this effect is due to the fact that whirl formation prevents the formation of a protective layer locally at the front end of the inserts.

Further improvement of these inserts has therefore been developed for e.g. disclosed in European patent No. EP 1 184 081 B1 (Niro), where each insert is provided with a transition surface in the inwards protruding part of the insert, thereby directing the flow of the feed along the transition surface to the inner side of the external wall thereby avoiding wear on the bushing. It is believed that the wear on the bushings in this way is limited since the whirl formed in front of the insert is controllably led past the front of the insert, during rotation to form a coherent layer of protective material on the inner side of the external wall.

In the prior art, it has furthermore been suggested to mount the inserts so that they can be turned, as they are gradually being worn, in order to increase their overall lifetime. However, turning of the inserts requires that the apparatus is shut down. The need to frequently turn the inserts results in manufacturing stops, which are time-consuming and costly due to time periods without any manufacturing. Furthermore, in order to meet demands set in for instance environmental regulations, start-and-stop and downtime should generally be reduced to a minimum.

SUMMARY OF THE INVENTION

With this background it is an object of the present invention to provide an improved insert for use in an atomizer wheel, which has increased resistance properties, and which furthermore limits the need for rotation and replacement of the inserts.

In a first aspect, this object is met by an insert of the kind mentioned in the introduction, which is furthermore characterized in that at least the inlet offset from the longitudinal axis such that the centre axis of the channel is offset from the longitudinal axis of the insert.

By this design, an enlarged portion containing an increased amount of material is formed in one segment near the inlet of the insert. In this manner, it has shown possible to increase the lifetime of the insert without the need for scheduled starts and stops having as its purpose to rotate the insert to shift the inlet segment exposed most heavily to the wear.

From the inlet, the channel may in principle extend in any suitable manner, provided sufficient material is present in order to secure operation. In a simple embodiment of the insert according to the invention, said outlet is offset from the longitudinal axis.

In one embodiment, the centre axis of said channel is substantially parallel with the longitudinal axis of the insert. This insert thus has substantially the corresponding flow as a traditional insert having a centrally positioned channel.

The position and the dimensions of the inlet, and of the outlet and other parts of the channel, may be varied according to for instance the material, the field of application, and dimensions of the insert. In one embodiment, the inlet lies entirely outside the longitudinal axis, but alternatively, an overlap between the inlet and the longitudinal axis may be provided.

The cross-section of the inlet is preferably chosen from the group of different shapes comprising circular, elliptical, oval, ovoid, quadratic and rectangular.

The channel may have a uniform cross-section from said inlet to said outlet.

Although the shape may be varied throughout, it is possible also to vary the dimensions of the channel, for instance by providing the channel with a cross-section that decreases or increases from said inlet towards said outlet.

In order to optimize the flow conditions around the inlet and the outlet, the channel may have the shape of a funnel in at least one of said inlet or outlet.

In an advantageous embodiment, said inlet is symmetrical about at least one axis other than radial.

Alternatively to embodiments, in which the centre axis of the channel is parallel with the longitudinal direction of the insert, the centre axis of said channel may form an angle in the interval 0 to 30° with the longitudinal direction of the insert.

Alternatively or additionally, the centre axis of said channel may form an angle with a plane extending in a radial direction of said insert in the interval 0 to 30°.

Preferably, the external surface is of a substantially tapered shape. However, as an alternative, the external surface may be of a cylindrical shape.

The overall resistance against wear and tear, and the flow conditions, are increased in an embodiment, in which the insert comprises a gripping recess extending from said inner end face to the external surface.

The gripping recess comprises a first transition surface extending at angle from the inner end face to a second transition surface extending at an angle from said first transition surface towards said external surface face.

As the insert itself is asymmetrical about the longitudinal axis, the gripping recess may be formed asymmetrically relative to the longitudinal axis of the insert.

In a second aspect of the invention, an atomizer wheel for a spray dryer for atomizing slurries of abrasive material is provided. The atomizer wheel comprises a wheel hub and a substantially cylindrical external wall defining an annular chamber of a substantially bowl-like cross-sectional shape coaxially surrounding said hub, a plurality of ejection apertures, each extending in a substantially radial direction, distributed over the circumference of said external wall, and a plurality of inserts arranged in said ejection apertures, each insert being formed in accordance with the first aspect of the invention.

In order to increase the overall lifetime of the atomizer wheel, the atomizer wheel may furthermore comprise a bushing mounted externally of the corresponding insert in each ejection aperture.

In further aspects of the invention, use of an insert and an atomizer wheel comprising such inserts in accordance with the first aspect is provided for spray drying absorption for flue gas cleaning.

In the following the invention will be described in further detail by means of embodiments thereof and the appended drawings.

DESCRIPTION OF PREFERRED EMBODIMENTS

Figure 1:
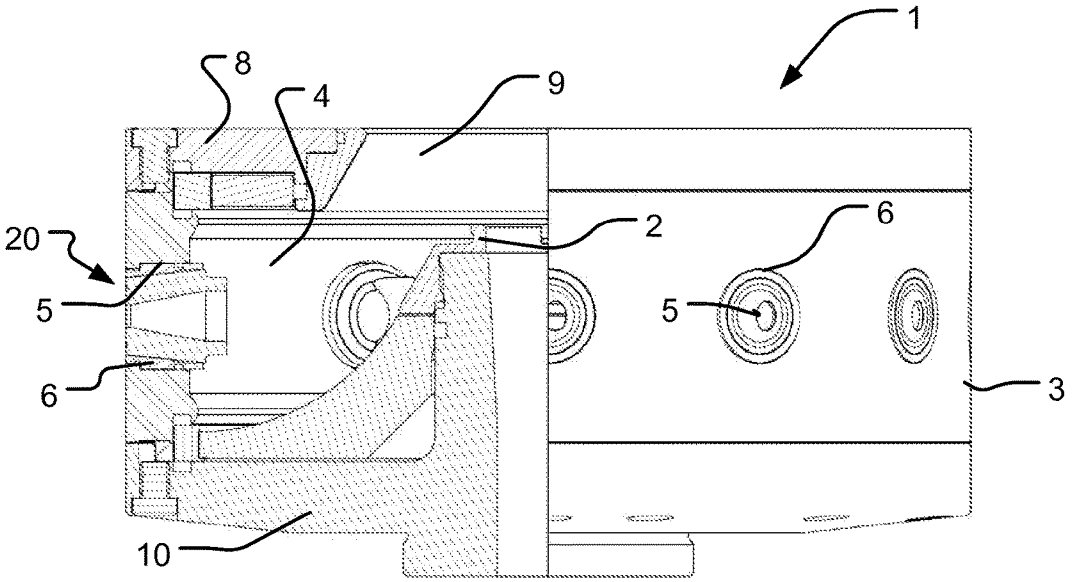
FIG. 1 is a partial sectional side view of an atomizer wheel in an embodiment of the invention.
Figure 2:
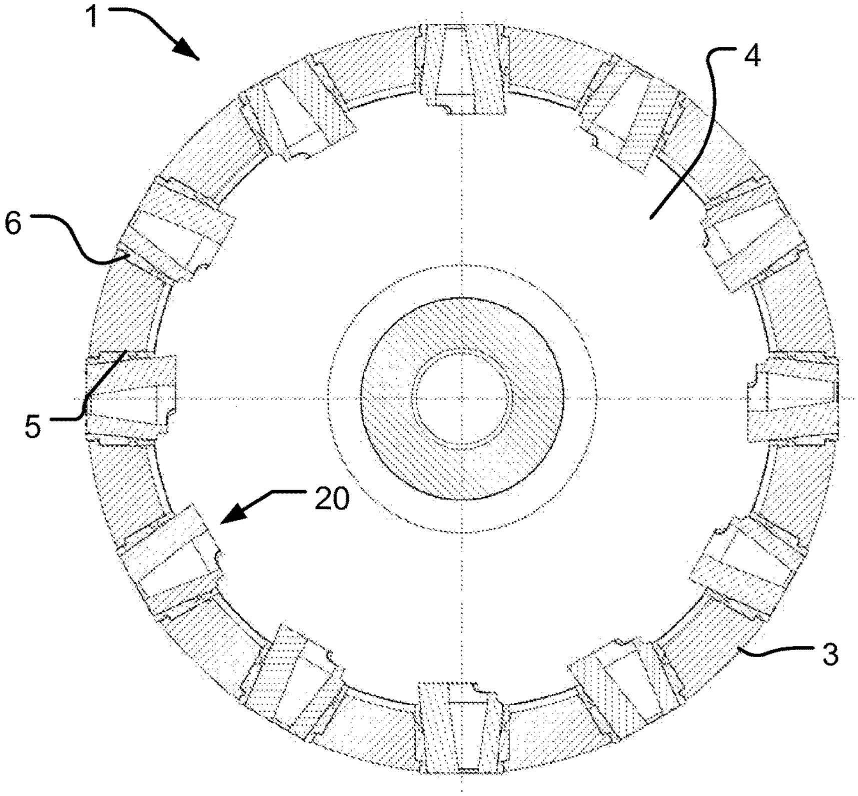
FIG. 2 is a sectional top view of the atomizer wheel shown in FIG. 1.

In FIGS. 1 and 2, an embodiment of an atomizer wheel 1 for atomizing slurries of abrasive material is illustrated, where the atomizer wheel 1 comprises a wheel hub 2 defining an axial direction of the atomizer wheel, and a substantially cylindrical external wall 3 defining an annular chamber 4 of a substantially bowl-like cross-sectional shape coaxially surrounding the hub 2, which is delimited by a cover 8 and a bottom portion 10. The slurries to be atomized are provided concentrically around the hub 1 through an aperture 9 in the cover 8. The circumference of the external wall 3 of the atomizer wheel 1 is provided with a number of ejection apertures 5, through which a supplied slurry is ejected outwards in atomized form during operation into a surrounding drying chamber in which the fine particles formed by the atomization are dried so that their content of solids drops down to the bottom of the drying chamber, possibly in the form of a fine powder.

As shown most clearly in FIG. 2, the ejection apertures 5 each extends in a substantially radial direction of the atomizer wheel and are distributed over the circumference of said external wall. In the embodiment shown, the atomizer wheel is adapted to rotate in a counter-clockwise direction.

In order to prevent wear on the atomizer wheel 1 itself, inserts 20 fitting into the ejection apertures 5 are inserted in the individual ejection apertures 5. In the embodiment shown, each insert 20 is in turn fitted into a steel bushing 6; however, in some fields of application, it is also conceivable to fit the inserts 20 directly into the wall of the atomizer wheel. As indicated and as will be described in further detail below, a longitudinal direction of the respective inserts 20 coincides with the radial direction of the atomizer wheel.

Figure 3:
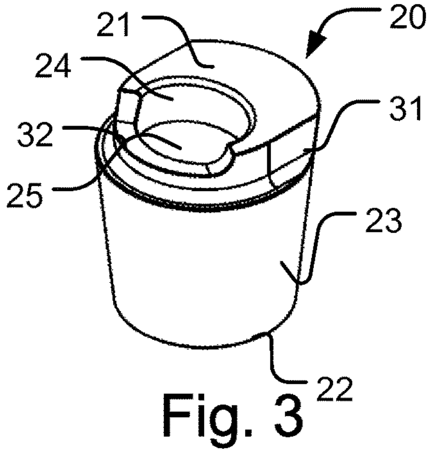
FIG. 3 is a perspective view of an insert for an atomizer wheel in a first embodiment of the invention.
Figure 4:
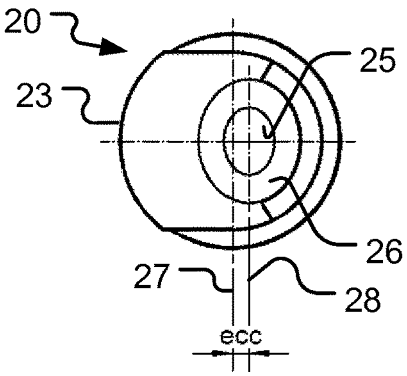
FIG. 4 is a top view of the insert of FIG. 3.
Figure 5:
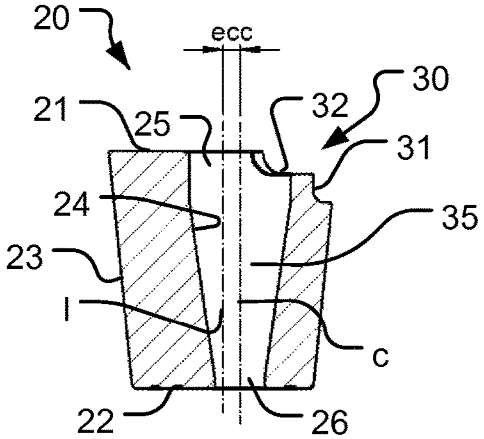
FIG. 5 is a cross-sectional view of the insert of FIGS. 3 and 4, along the line V-V in FIG. 4.

FIGS. 3 to 5 illustrate a first embodiment of the insert 20 adapted to fit into a corresponding ejection aperture 5 in an atomizer wheel, for instance an atomizer wheel having the overall properties shown in FIGS. 1 and 2.

The insert 20 has a longitudinal axis I and comprises an inner end face 21, an outer end face 22, an external surface 23 and an internal surface 24 defining a channel 35 extending between an inlet 25 at the inner end face 21 and an outlet 26 at the outer end face 22. As the inner end face 21 has a larger extension than the outer end face 22 in the first embodiment, the external surface 23 is of a substantially tapered overall shape. Furthermore, is is noted that In the embodiment shown in FIGS. 3 to 5, the channel 35 has a uniform cross-sectional shape from the inlet 25 to the outlet 26, however with varying dimensions.

Referring in particular to FIG. 5, the channel 35 has a centre axis c. As indicated in the above, the longitudinal axis I of the insert 20 substantially coincides with the radial direction of the atomizer wheel 1 in the mounted position of the insert in the atomizer wheel. The centre axis c of the channel 35, however, is eccentric to or offset from the longitudinal axis I of the insert 20 and hence relative to the radial direction of the atomizer wheel 1 in the mounted position.

In the first embodiment shown in FIGS. 3 to 5, the offsetting is provided in that the inlet 25 and the outlet 26 are both offset from the longitudinal axis I of the insert, such that the centre axis c of the channel 35 is offset from the longitudinal axis I of the insert 20 in parallel therewith. The offset marked by "ecc" in FIGS. 4 and 5 is thus the same throughout the channel 35, from the inlet 25 (cf. the distance between lines 27 and 28 denoting the longitudinal axis I and the centre axis c, respectively, in FIG. 4) to the outlet 26. The range of the offset may vary according to other parameters of the insert, such as the overall dimensions of the insert, shape of the channel 35, thickness of the wall between the external surface 23 and the internal surface 24, etc. Typically, however, for an insert having an overall diameter at the inner end face 21 of 30 to 40 mm, and a diameter of 20 to 30 mm at the outer end face 22, the offset typically lies in the range 2 to 5 mm. In the first embodiment, the inlet 25 overlaps the longitudinal axis I of the insert 35. However, it is also conceivable to offset the inlet opening to such an extent that no overlap is provided and the inlet lies entirely outside the longitudinal axis.

As a consequence of the offset inlet 25, the insert 20 is provided with an enlarged portion at the inner end face 21 containing a larger amount of material between the external surface 23 and the internal surface 24 in one segment of the insert 20 than in the opposite. Referring back to FIG. 2, when in use, an insert 20 of this kind thus meets the slurry at the uppermost portion of the internal surface 24 positioned at the trailing edge of the inlet 25, when seen in the tangential direction of the atomizer wheel, which is thus the edge that is worn more heavily due to abrasion. As the amount of material in this area is increased due to the offset inlet 25, the lifetime of the insert is increased.

In the first embodiment, a further feature is present which is particularly efficient in ensuring minimal wear on the bushings of the atomizer wheel, namely that the insert 20 has at the inner end face 21 a gripping recess, generally designated 30, which extends from the inner end face 21 to the external surface 23, best illustrated in FIG. 5. In the embodiment shown, the gripping recess 30 comprises a first transition surface 31 extending at angle from the inner end face 21 to a second transition surface 32 extending at an angle from the first transition surface 31 towards the external surface 23. The gripping recess and transition surface(s) may take other forms as well, as described in further detail in the above-mentioned European patent No. EP 1 184 081 B1. Thus, it is also conceivable that the gripping recess 30 may comprise more than two portions, or only one portion thus forming a bevelled gripping recess. The gripping recess 30 may also be designed as any suitable surface or combination of surface portions having an all in all concave shape. As indicated, the gripping recess 30 in the embodiment shown is asymmetrical relative to the longitudinal axis I of the insert 20. This is primarily due to the fact that there is no need for a gripping recess, or transition surface(s), at the trailing side of the insert. It has turned out that a shape of the enlarged portion extending substantially in parallel with the tangential direction of the atomizer wheel provides for an advantageous flow pattern such that flow of slurry meeting the following insert in the circumferential direction is not adversely affected.

When inserted into the atomizer wheel in FIGS. 1 and 2, the gripping recess 30 of the insert 20 faces the slurry in the counter-clockwise rotation of the atomizer wheel 1, which entails that the direction of the flow of the slurry to be atomized is changed by virtually 90 degrees and is thus led past the bushing 6 and further onto the internal surface 24, thereby minimizing the wear on the bushing. However, in other embodiments of the insert according to the invention, there is not necessarily a gripping recess, or the gripping recess may have other configurations.

Independently of the provision of a gripping recess, the transition between the inner end face 21 and the internal surface 24 may as shown be provided as a bevelled or chamfered edge, which is believed to postpone the point in time when the abrasion leads to noticeable wear on the trailing edge of the inlet 25 and hence the enlarged portion, as a sharp edge will be more prone to wear and tear. The chamfered edge needs not extend throughout the circumference but may be formed only in a sector covering for instance 20-50°.

In the first embodiment shown in FIGS. 3 to 5, the shape of the inlet 25 is substantially elliptical. By forming the inlet other than for instance circular, a larger surface subjected to the load of the slurries is provided. This, in turn, is believed to have an advantageous effect on the lifetime of the insert. The elliptical shape of the inlet 25 is present throughout the channel 35; however as is most apparent from the cross-sectional view of FIG. 5, the first portion of the channel 35 is substantially straight, whereas the remaining portion towards the outlet 26 is narrowed. The shape may in principle be varied in any suitable manner as will be described in further detail below; however, it is preferred that inlet is symmetrical about at least one axis other than radial.

Other features, and variations thereof, will now be described.

Figure 6A:
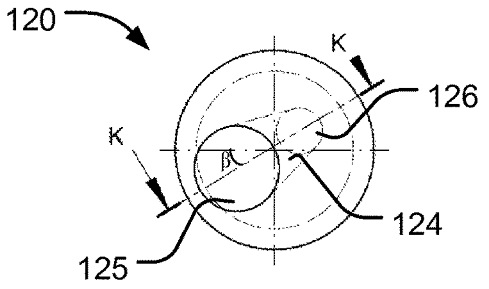
FIG. 6*a* is a schematic top view of an insert in a second embodiment of the invention.
Figure 6B:
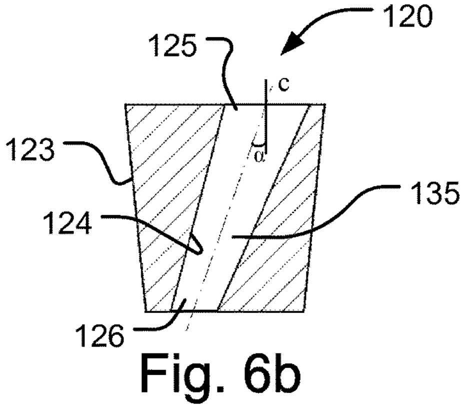
FIG. 6*b* is a cross-sectional view of the insert of FIG. 6*a*, along the line K-K in FIG. 6*a;*

Referring to FIGS. **6*a* and 6*b*, a second embodiment of the insert 120 according to the invention is shown. Elements having the same or analogous function as in the embodiment of FIGS. 3 to 5, carry the same reference numerals to which 100 is added. In the second embodiment the inlet 125 of the insert 120 lies substantially entirely outside the longitudinal axis I and extends towards the outlet 126 with decreasing cross-section of the channel. The shape of the channel 135 through the inlet 25 towards the outlet 26 forms an angle $\alpha$ with the longitudinal direction I of the insert. The angle typically lies in the interval 0 to 30°, here approximately 20°. In this embodiment, the channel 135 also forms an angle $\beta$ with a plane extending in a radial direction of the insert, which is indicated in FIG. 6*b***. This angle also typically lies in the interval 0 to 30°, here approximately 30°.

Notice is taken regarding the embodiment illustrated in FIGS. **6*a* and 6*b* that a gripping recess corresponding to gripping recess 30** is absent, which does not exclude the option of incorporating a gripping recess in this embodiment as well.

The inlet 125 is substantially circular and so is the outlet 126. The cross-sectional shape of the channel 135 is uniformly circular and the dimensions diminish from the inlet 125 to the outlet 126.

Figure 7A:
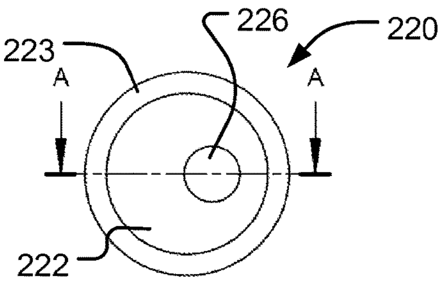
FIG. 7*a* is a schematic bottom view of a third embodiment of an insert according to the invention.
Figure 7B:
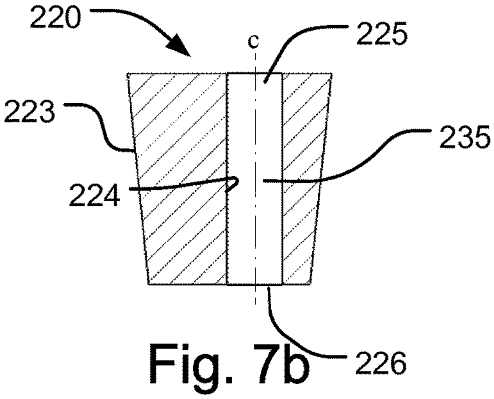
FIG. 7*b* is a cross-sectional view of the insert of FIG. 7*a*, along the line A-A in FIG. 7*a;*

FIGS. 7*a* and 7*b* illustrate a third embodiment of the invention, where 200 is added to reference numerals of elements having the same or analogous function as in the embodiment of FIGS. 3 to 5. In FIG. 7*a* the inlet 225 lies entirely outside the longitudinal axis as in the previously described embodiment. However, contrary to the previous embodiment the channel has a uniform cross-sectional dimension from the inlet 225 to the outlet 226, extending in parallel with the longitudinal axis, best illustrated in FIG. 7*b*.

Figure 8A:
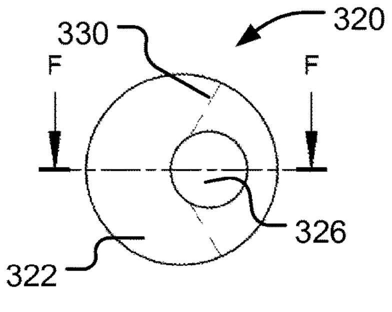
FIGS. 8*a* and 8*b* are views corresponding to FIGS. 7*a* and 7*b*, respectively, of a fourth embodiment of an insert according to the invention, the cross-sectional view taken along the line F-F.
Figure 8B:
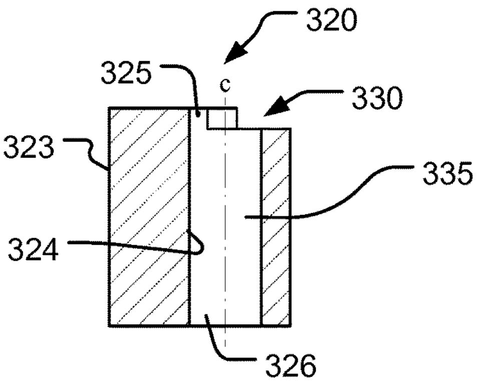

FIGS. 8*a* and 8*b* illustrate a fourth embodiment of the invention, where 300 is added to reference numerals of elements having the same or analogous function as in the embodiment of FIGS. 3 to 5. The insert is in this embodiment provided with a gripping recess 330 at the inlet 325, while having an uniform cross-section of the channel, best illustrated in FIG. 8*b*. As shown in FIG. 8*b*, the insert 320 has a substantially cylindrical external shape, as the external surface 323 takes the form of a cylindrical surface. This shape is not as such preferred, as the insert 320 is dependent on shoulders on the bushing or on the atomizer wheel itself. Even more important, the cylindrical shape does not entail the positive engagement provided by the tapered external shape of the other embodiments, which in turn does not entail the security against unintentional release of the inserts from the atomizer wheel in the case of failure of the bushing or other retaining elements.

Figure 9A:
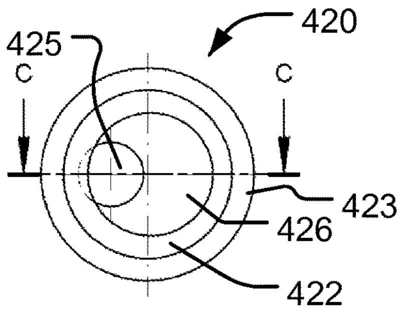
FIGS. 9*a* and 9*b* are views corresponding to FIGS. 7*a* and 7*b*, respectively, of a fifth embodiment of an insert according to the invention, the cross-sectional view taken along the line C-C.
Figure 9B:
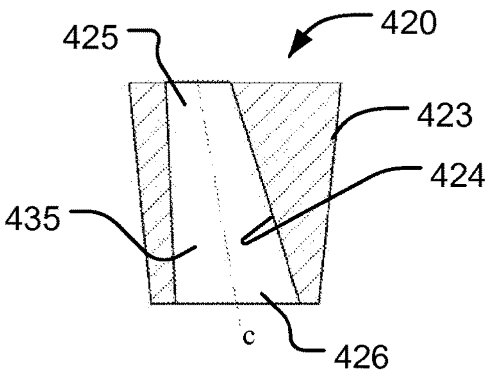

In a fifth embodiment illustrated in FIGS. 9*a* and 9*b*, with 400 added to reference numerals of elements having the same or analogous function as in the embodiment of FIGS. 3 to 5, the centre axis of the channel forms an angle in the interval 0 to 30° with the longitudinal direction of the insert, while having an increasing cross-section from the inlet 425 to the outlet 426.

Figure 10A:
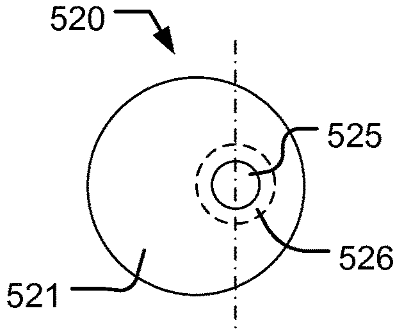
FIG. 10*a* is a schematic top view of a sixth embodiment of an insert according to the invention.
Figure 10B:
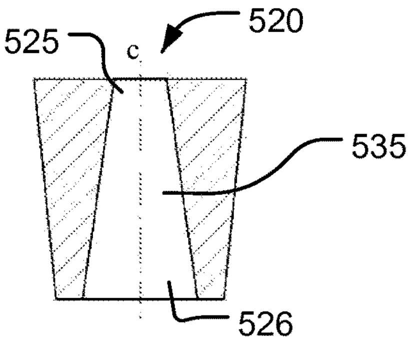
FIG. 10*b* is a cross-sectional view of the insert of FIG. 10*a;*

In a sixth embodiment of the invention, illustrated in FIGS. 10*a* and 10*b*, the channel has the shape of a funnel extending with the narrow end from the inlet 525 to the outlet 526, best illustrated in FIG. 10*b*, while still maintaining a larger surface area of the external wall 523.

Figure 11A:
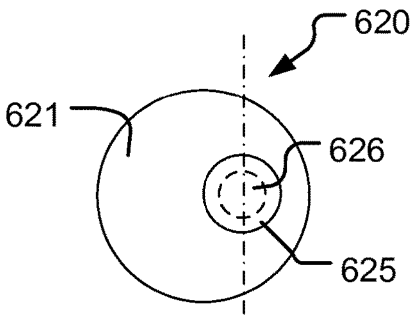
FIGS. 11*a* and 11*b* are views corresponding to FIGS. 10*a* and 10*b*, respectively, of an insert in a seventh embodiment of the invention.
Figure 11B:
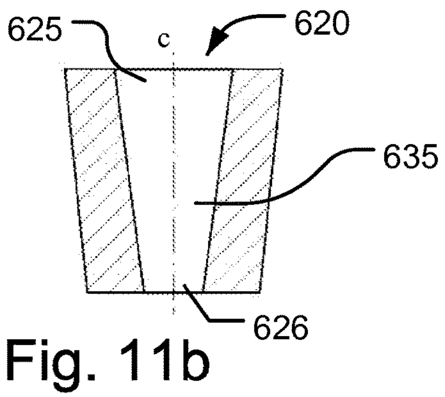

Alternatively, in a seventh embodiment the funnel shape of the channel extends with the widest end from the inlet 625 to the outlet 626, while still maintaining the larger surface area of the external wall 623, best illustrated in FIG. 11*a-b*.

Figure 12:
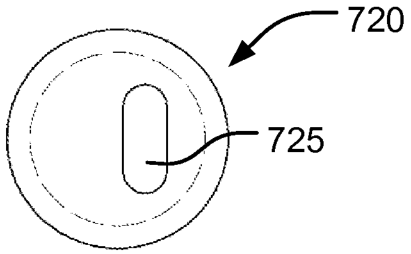
FIGS. 12 to 14 are schematic top views of further embodiments of an insert according to the invention.
Figure 13:
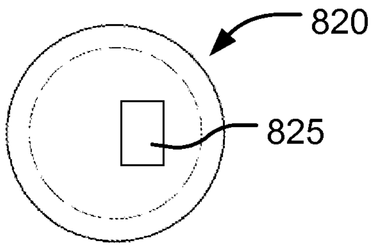
Figure 14:
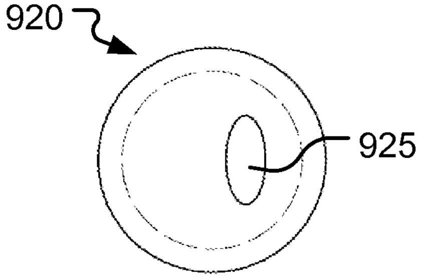

Furthermore, the shape of the inlet and the outlet and other parts of the channel of the insert may differ in different embodiments, as illustrated in FIG. 12 trough FIG. 14, by the cross-section of the channel, seen from the inlet 725, 825, 925, being chosen from the group of different shapes comprising circular, elliptical, oval, ovoid, quadratic and rectangular.

Figure 15:
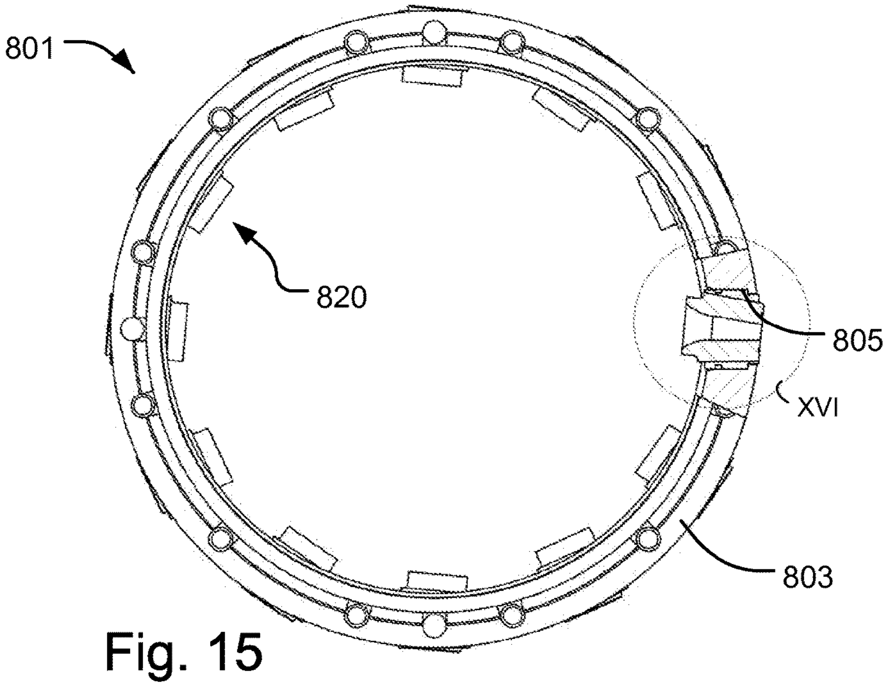
FIG. 15 is a part sectional top view of an atomizer wheel in a still further embodiment.
Figure 17:
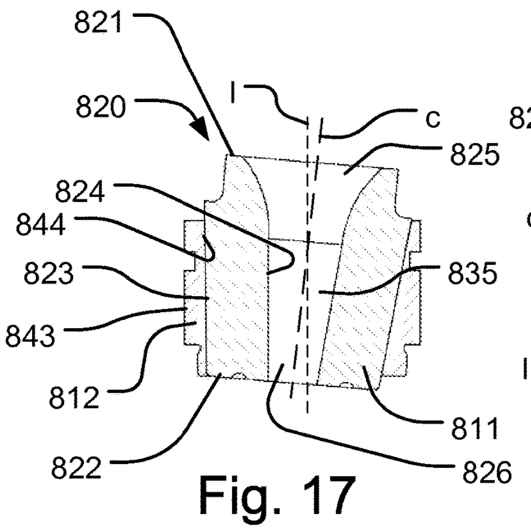
FIG. 17 is a sectional view of a two-part insert of the atomizer wheel shown in FIGS. 15 and 16.
Figure 16:
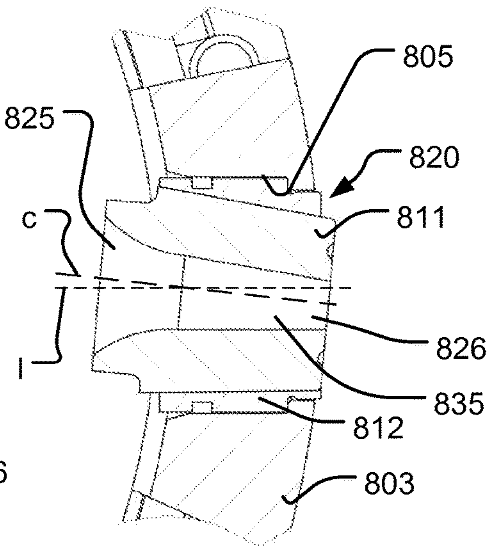
FIG. 16 is a partial view of detail XVI in FIG. 15, on a larger scale.

Referring now to FIGS. 15 to 17, a still further embodiment of the atomizer wheel is shown. The atomizer wheel generally designated 801 has a a substantially cylindrical external wall 803 defining an annular chamber and a radial direction of the atomizer wheel. Ejection apertures 805 are distributed over the circumference of the external wall 803 in such a way that the individual ejection aperture 805 extends substantially in the radial direction. In each ejection aperture 805, an insert generally designated 820 is accommodated.

Each insert 820 has a longitudinal axis I and comprises an insert lining 811 and an insert jacket 812. The insert lining 811 has an inner end face 821 facing the interior of the atomizer wheel 801, an outer end face 822, an external side 823 and an internal side 824. The internal side 824 of the insert lining 811 forms the internal surface of the insert 820 and defines a channel 835 having a centre axis c and extending between an inlet 825 at the inner end face 821 and an outlet 826 at the outer end face 822.

In the embodiment shown, the centre axis c of the channel 835 in the insert lining 811 coincides with a rotational symmetry axis of the insert lining 811. Furthermore, the external side 823 is of a substantially tapered overall shape to provide the insert lining 811 with the shape of a straight cone.

The insert jacket 812 has an external side 843 which is substantially cylindrical and with stepped portions known per se and not described in detail, including recesses for one or more sealings and for cooperation with corresponding portions of the external wall 803 of the atomizer wheel 801. The insert jacket 812 has an internal side 844 which in the embodiment shown is asymmetric and formed as an oblique cone.

Positioning the symmetrical insert lining 811 in the asymmetrical insert jacket 812 thus entails that the centre axis c of the channel 835 is offset from the longitudinal axis I of the insert 820 and hence relative to the radial direction of the atomizer wheel 801 in the mounted position. When the atomizer wheel turns, in the counter-clockwise direction in the embodiment shown, liquid to be atomized forced radially outwards from the hub forming the center (not shown) in the annular chamber. The inner portions of the insert 820 thus collide with the liquid which is guided into the inlet 825, through the channel 835 and out through the outlet 826. Due to the configuration of the insert 820, the trailing or back edge of the inlet 825 is positioned closer to the center of the atomizer wheel than the front edge. In turn, this has shown to contribute to an increase in the liquid flow through the channel of the insert. Hence, the overall production efficiency is increased. Depending on the dimensions of the insert 820, the distance measured in the radial direction between the trailing edge and the front edge typically lies in the range 2-3 mm in an insert having typically overall outer dimensions of 30-45 mm wide, i.e. here diameter, and 30-45 mm long, i.e. length between inner end and outer end.

The atomizer wheel may be used for spray drying absorption for flue gas cleaning or industrial off gasses, from for example power plants and metal industries, respectively. The flue gas may emanate from for instance power plants, industrial off gases, e.g. from metal industries. The invention is also useful for drying of abrasive feeds in general, e.g. in the chemical industry or in the mining industry.

The invention should not be regarded as been delimited to the embodiments shown and described in the above, but various modifications and combinations may be carried out without departing from the scope of the appended claims.

The invention claimed is:

1. An atomizer wheel for a spray dryer for atomizing slurries of abrasive material, comprising:

a substantially cylindrical external wall defining an annular chamber and a radial direction of the atomizer wheel, a plurality of ejection apertures distributed over the circumference of said external wall, and a plurality of inserts arranged in said ejection apertures, each insert spanning at least the entire width of the external wall of the atomizer wheel and having a longitudinal axis and comprising:
an inner end face configured to be exposed to an annular chamber of the atomizer wheel, the insert being configured for the inner end face to extend into the annular chamber;
an outer end face configured to be exposed to an outside of the atomizer wheel;
an external surface; and
an internal surface defining only a single substantially straight channel having a centre axis and extending between an inlet at the inner end face and an outlet at the outer end face, the insert being configured for said inlet to be positioned in the annular chamber, and an outlet at the outer end face, wherein at least said inlet is offset from the longitudinal axis such that the centre axis of the channel is substantially parallel to and offset from the longitudinal axis of the insert, whereby the insert is provided with an enlarged portion at the inner end face and the inlet containing a larger amount of material between the external surface and the internal surface in one segment of the insert than in an opposite segment relative to the centre axis.

2. The atomizer wheel according to claim 1, said outlet is offset from the longitudinal axis.

3. The atomizer wheel according to claim 2, wherein the centre axis of said channel is substantially parallel with said longitudinal axis.

4. The atomizer wheel according to claim 1, wherein the inlet lies entirely outside the longitudinal axis.

5. The atomizer wheel according to claim 1, wherein there is an overlap between the inlet and the longitudinal axis.

6. The atomizer wheel according to claim 1, wherein the cross-section of the inlet is chosen from the group of different shapes comprising circular, elliptical, oval, ovoid, quadratic and rectangular.

7. The atomizer wheel according to claim 6, wherein said channel has a uniform cross-section from said inlet to said outlet.

8. The atomizer wheel according to claim 6, wherein said channel has a cross-section that decreases or increases from said inlet towards said outlet.

9. The atomizer wheel according to claim 1, wherein said channel has the shape of a funnel in at least one of said inlet or outlet.

10. The atomizer wheel according to claim 1, wherein said inlet is symmetrical about at least one axis other than radial.

11. The atomizer wheel according to claim 1, wherein the centre axis of said channel forms an angle in the interval 0 to 30° with the longitudinal direction of the insert.

12. The atomizer wheel according to claim 11, wherein the centre axis of said channel forms an angle with a plane extending in a radial direction of said insert in the interval 0 to 30°.

13. The atomizer wheel according to claim 1, wherein said external surface is of a substantially tapered shape or of a cylindrical shape.

14. The atomizer wheel according to claim 1 comprising a gripping recess extending from said inner end face to the external surface.

15. The atomizer wheel according to claim 14, wherein the gripping recess comprises a first transition surface extending at angle from the inner end face to a second transition surface extending at an angle from said first transition surface towards said external surface face.

16. The atomizer wheel according to claim 14, wherein the gripping recess is asymmetrical relative to the longitudinal axis of the insert.

17. An atomizer wheel for a spray dryer for atomizing slurries of abrasive material, comprising:
a substantially cylindrical external wall defining an annular chamber and a radial direction of the atomizer wheel,
a plurality of ejection apertures distributed over the circumference of said external wall, each ejection aperture extending substantially in said radial direction, and
a plurality of inserts arranged in said ejection apertures, each insert spanning at least the entire width of the external wall of the atomizer wheel and having a longitudinal axis and comprising:
an inner end face configured to be exposed to the annular chamber of the atomizer wheel the insert being configured for the inner end fact to extend into the annular chamber;
an outer end face configured to be exposed to an outside of the atomizer wheel;
an external surface; and
an internal surface, said internal surface defining only a single substantially straight channel having a centre axis and extending between an inlet at the inner end face, the insert being configured for said inlet to be positioned in the annular chamber, and an outlet at the outer end face, wherein at least said inlet is offset from the longitudinal axis such that the centre axis of the channel is substantially parallel to and offset from the longitudinal axis of the insert, whereby the insert is provided with an enlarged portion at the inner end face and the inlet containing a larger amount of material between the external surface and the internal surface in one segment of the insert than in an opposite segment relative to the centre axis.

18. The atomizer wheel as claimed in claim 17, wherein each insert comprises an insert lining and an insert jacket, each having an internal side and an external side, the external side of the insert jacket constituting the external surface of the insert facing the ejection aperture, and the internal side of the insert lining constituting the internal surface defining the channel of the insert.

19. The atomizer wheel as claimed in claim 18, wherein the insert jacket is substantially asymmetrical.

20. The atomizer wheel as claimed in claim 19, wherein the internal side of the insert jacket has the shape of an oblique cone.

21. The atomizer wheel as claimed in claim 18, wherein the insert lining is symmetrical.

22. The atomizer wheel as claimed in claim 21, wherein the external side of the insert lining has the shape of a straight cone.

23. The atomizer wheel according to claim 22, wherein the internal side of the insert jacket has the shape of an oblique cone.

24. An atomizer wheel for a spray dryer for atomizing slurries of abrasive material, comprising:
a substantially cylindrical external wall defining an annular chamber and a radial direction of the atomizer wheel,
a plurality of ejection apertures distributed over the circumference of said external wall, and
a plurality of inserts arranged in said ejection apertures, each insert spanning at least the entire width of the external wall of the atomizer wheel and having a longitudinal axis and comprising:

an inner end face configured to be exposed to an annular chamber of the atomizer wheel, the insert being configured for the inner end face to extend into the annular chamber;

an outer end face configured to be exposed to an outside of the atomizer wheel;

an external surface; and an internal surface defining a substantially straight channel having a centre axis and extending between an inlet at the inner end face and an outlet at the outer end face, the insert being configured for said inlet to be positioned in the annular chamber, and an outlet at the outer end face, wherein at least the inlet is offset from the longitudinal axis such that the centre axis of the channel is offset from the longitudinal axis of the insert, whereby the insert is provided with an enlarged portion at the inner end face and the inlet containing a larger amount of material between the external surface and the internal surface in one segment of the insert than in an opposite segment relative to the centre axis, and wherein a centre of the longitudinal axis of the insert passes through at least a portion of the channel.

* * * * *